Figure 1:
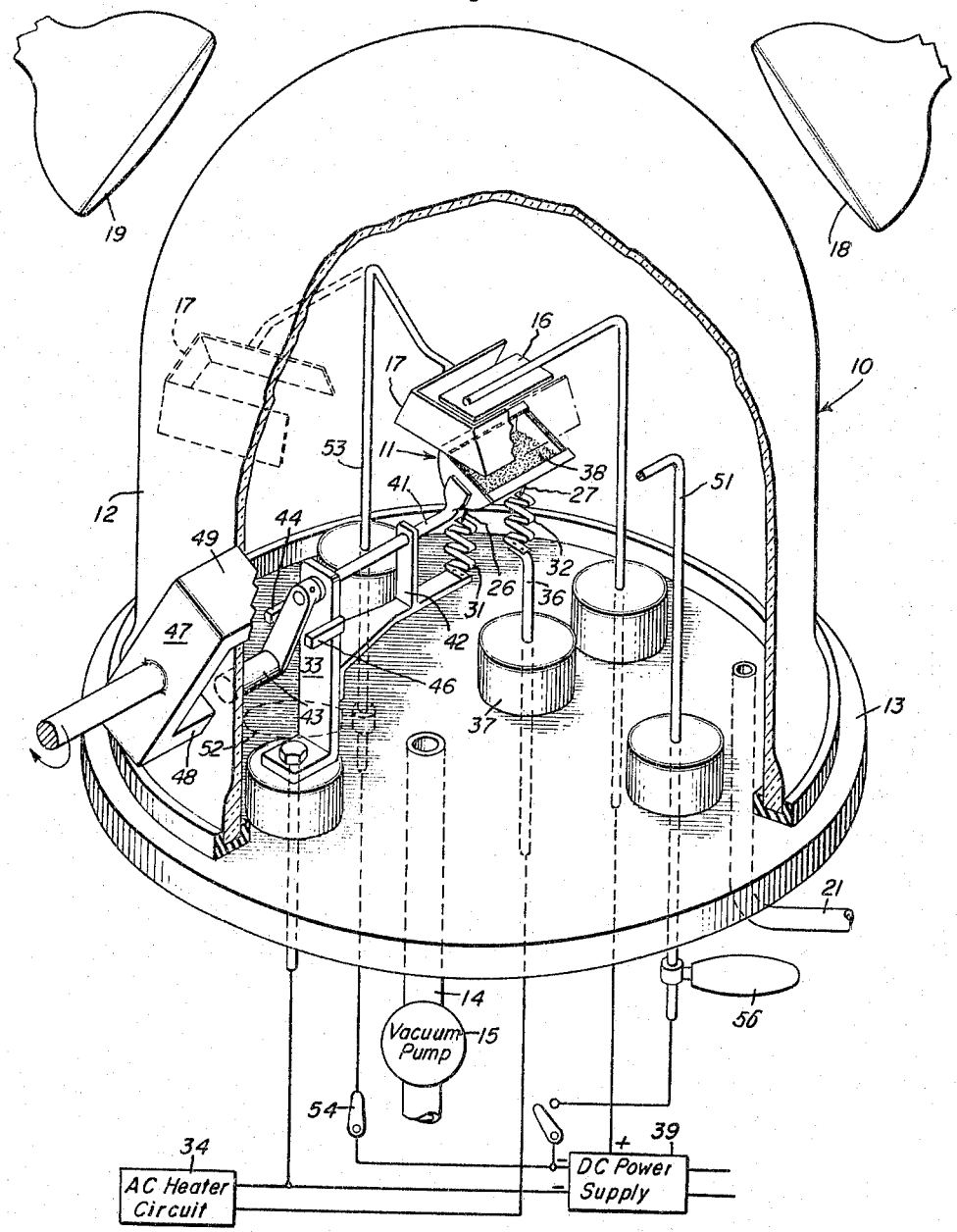

June 13, 1967  K. A. DARROW ETAL  3,325,393
ELECTRICAL DISCHARGE CLEANING AND COATING PROCESS
Filed May 28, 1964

Inventors:
Kenneth A. Darrow;
Edwin H. Hull,
by Leo A. Marlossi
Their Attorney.

3,325,393
ELECTRICAL DISCHARGE CLEANING AND COATING PROCESS
Kenneth A. Darrow, Sprakers, and Edwin H. Hull, Scotia, N.Y., assignors to General Electric Company, a corporation of New York
Filed May 28, 1964, Ser. No. 370,797
3 Claims. (Cl. 204—192)

This invention relates to a process and apparatus for cleaning and coating very hard and relatively inert crystalline material with strongly adherent metal coatings and more particularly to the use of an improved method of glow discharge ion bombardment at relatively low temperatures both to clean the surfaces of diamond crystals and to coat these cleaned crystalline surfaces with metal in a manner insuring tenacious bonding between the diamond surface and the metal coating.

Although the process described herein is equally applicable to other hard inert substances, as for example, cubic boron nitride crystals and aluminum oxide crystals, the advantages of this process are most clearly illustrated in connection with the coating of diamonds wherein the nature of the coated crystal requires operation at a relatively low temperature. In the case of diamond, the problem is that of graphitization of the diamond by exposure to elevated temperatures; i.e., at atmospheric pressure such graphitization is generally accepted as occurring in perceptible quantities at about 800° C.

This invention is an improvement over the invention described and claimed in the patent application filed simultaneously herewith, S.N. 370,872—Vanderslice, which application is assigned to the assignee of the instant application. Although this copending application describes a vast improvement over the methods previously employed for coating diamonds, certain features of the process as disclosed therein have been found susceptible of significant improvement particularly in the predictability of producing a high quality bond.

In the glow discharge ion bombardment method described in S.N. 370,872, diamond crystals are introduced into a glow discharge apparatus wherein their outer surfaces are cleaned at operating temperatures below the graphitization temperature of diamond. Thereafter, when sufficient cleaning has been effected, a coating metal is deposited over the surface of the diamond crystals so cleaned during continual conduct of the cleaning bombardment operation. As a result, a good bond is produced between the diamond crystal and the metal coating applied thereto. Once the coating material is affixed to the diamond surface, soldering or brazing techniques are applied in those cases in which it is desired to bond the completely coated diamond particles into a conglomerate mass, or compact, by various methods which will vary in accordance with the particular coating metals employed.

A bonded diamond compact composed of many small diamond particles randomly oriented will not cleave along a single cleavage plane as will a single crystal but must follow a tortuous course dictated by the cleavage directions of the individual randomly oriented particles. Obviously a higher stress is required to cause this type of cleavage in a diamond compact.

It is therefore an object of this invention to provide a relatively low temperature process for coating an inert crystalline material in a manner productive of a bond of superior strength between the substrate and the coating material.

It is another object of this invention to provide a process and apparatus for coating diamonds with metal by gas discharge sputtering in a manner insuring substantially complete elimination of non-diamond impurities from the surface of the diamond during the coating process.

A further object of this invention is the provision of a process and apparatus for optimum cleaning of the surface of diamond crystals by the use of glow discharge ion bombardment to insure preparation of the surface for secure bonding of the coating material to the surface by a combination of mechanical and physical agencies and insuring the continued elimination of impurities from the diamond crystal surface during the coating operation without causing graphitization of the diamond crystals.

It is still a further object of this invention to provide a process and apparatus for cleaning and coating diamonds without exposing the cleaned diamonds to contaminating influences in the interim between the initial cleaning and the coating operation and with the overall cleaning and coating process being conducted at a temperature below the graphitization temperature of diamond.

In general, the above noted objects are secured by placing one or more diamonds to be coated in a bucket-shaped first electrode in a bell jar wherein a second electrode of a readily sputterable material is also located and is adapted to be swung into or out of operative position, these first and second electrodes being selectively connectable together electrically; providing a third electrode in the bell jar as an anode to effect glow discharge between this third electrode and either or both of the first and second electrodes; simultaneously heating and evacuating the interior of the bell jar in order to substantially completely remove water vapor and other contaminants from the diamond material, the electrodes and the interior of the bell jar; continuously flushing the entire system with hydrogen (first alone and later enriched with argon) holding an internal pressure of between about 100 and about 200 microns Hg; heating and holding the first electrode and the diamond material contained thereby to a temperature in the range of from about 600 to about 800° C. at least until the cleaning operations have been completed; initiating and sustaining a glow discharge between the first electrode and the third electrode to effectively remove the remaining surface contaminants from the diamond material by positive ion bombardment; continuously maintaining the second electrode at the same potential as the first electrode during the cleaning operation; making the second electrode more negative than the first electrode after completion of the cleaning operation, and sputtering particles of metal from the surface of the second electrode in its operative position by the use of glow discharge ion bombardment to effect coating of the diamond material.

Since both the first and second electrodes are operative during the sputtering operation, cleaning of the diamond material continues during the sputternig of metallic particles from the second cathode and these metal particles fall upon and adhere to the surface of the diamond material, no longer being heated. By adjusting the relative potentials of the first and second electrodes, the rate of deposition of metal may be controlled so that this rate is greater than the rate of metal removal from the diamond material.

By insuring the conduct of the entire cleaning-coating process in a reducing (hydrogen) atmosphere a higher degree of freedom from surface contamination is insured for the diamond material. By heating the diamond material during the cleaning operation three beneficial effects are produced. First, the elevated temperature of the diamond material accelerates the tendency of hydrogen to combine with such impurities to produce various gaseous compounds which are then removed from the system by the vacuum pump. Second, the effectiveness of the argon ions (from the argon gas, or helium or krypton, introduced in the latter portion of the cleaning operation) for knocking non-diamond deposits from the surface of the diamond material is increased. Third, with the diamond at a temperature between about 600 and about 800° C. the argon ions driven against the surface of the diamond material appear to freely move into and out of the diamond lattice whereby any net build-up of argon in the diamond lattice is prevented. The importance of the last benefit has been established in this manner. Often, when diamonds metal-coated by the method described in S.N. 370,872 are brazed, numerous small bubbles appear under the metal coat exerting a force to pry the metal coat loose from the diamond. This problem is particularly severe in those instances in which molybdenum coatings are applied to diamond because the molybdenum coat is impervious to the passage of argon and it is believed that these bubbles are caused by the release of argon ions previously trapped in the diamond lattice during the ionic bombardment cleaning. The release of the argon ions is caused by the heating of the diamond during the brazing operation. By initially avoiding the net build-up of argon ions within the diamond lattice, this problem is obviated.

Figure 2:
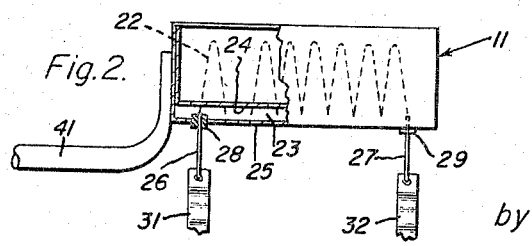

Other objects and features of the invention will become apparent to those skilled in the art as the disclosure is made in the following detailed description of a preferred embodiment of the invention as illustrated in the accompanying sheet of drawing in which:

FIG. 1 is an isometric view of the gas discharge apparatus with a schematic representation of the electrical connections; and FIG. 2 is a vertical cross-sectional view through the diamond-supporting cathode showing the location of the element for heating this cathode.

As explained in connection with FIG. 1, in the conduct of the process of this invention one or more diamonds are placed within the gas-discharge apparatus 10 in boat-like or cup-shaped receiver 11, which is connected as a cathode in the circuitry shown. Bell jar 12 after being placed in sealing engagement with the surface of support 13 is evacuated via pipe 14 by a vacuum pump 15 to a pressure of about $10^{-5}$ mm. Hg.

After evacuation, bell jar 12, the diamond material, metal anode 16, receiver cathode 11 and sputtering cathode(s) such as cathode 17 are heated for a period of 60 minutes with infrared red lamps 18, 19 to drive off water vapor and other gaseous material present. From the beginning of the heating period hydrogen gas is admitted to the system through pipe 21 to serve as a flushing medium to remove vapors and gases dislodged during the heating step. The pressure of the hydrogen is held between about 100 and about 200 microns Hg.

At the same time, receiver cathode 11 is heated to and held at a temperature of between about 600° and about 800° C. for controlled localized heating of both diamond material and cathode 11 during the subsequent cleaning step by means of Nichrome heater 22 (best illustrated in FIG. 2) disposed in space 23 between the hull 24 of cathode 11 and protective metal casing 25 thereof. Preferably both cathode 11 and casing 24 are composed of the same metal as that to be sputtered (cathode 17), as for example molybdenum or titanium, and are covered with a thin covering of electrical insulation on the surfaces thereof defining space 23. Lead-in wires 26, 27 for heater 22 are insulated from casing 24 by means of small annular insulators 28, 29. In order to allow for the agitation of receiver cathode 11 (to be described in greater detail below) lead-in wires 26, 27 are electrically connected to spring connectors 31, 32, respectively. As shown, spring connector 31 is connected electrically to receiver cathode mounting mast 33 and thereby is electrically connected to the alternating current heater circuit 34. Spring connector 32 is, likewise, electrically connected to heater circuit 34 via support rod 36 extending through insulator block 37. Appropriate sealing means are provided for each of the plurality of elements both movable and fixed, which must pass through support 13 in order to preserve the desired vacuum.

After the diamonds have been heated to the desired controlled temperature a cleaning cycle is instituted for the diamond material 38 wherein a voltage differential of about 1.0 to 1.5 kv. is impressed between anode 16 and receiver cathode 11 from D.C. power supply 39 to effect a glow discharge therebetween for about 60 minutes. During about the last 30 minutes of the aforementioned glow discharge ion bombardment cleaning cycle, argon is added to the hydrogen gas entering bell jar 12 through pipe 21 at a flow rate about 10 times that of the hydrogen gas in order that the heavier argon atoms will increase the effectiveness of the glow discharge cleaning.

If the sputtering cathode 17 is permitted to remain electrically neutral during the cleaning process, it will function to some degree as an anode and will become covered with a dark material in the same manner as occurs with the anode 16. If this layer is allowed to collect, then in the subsequent sputtering operation this dark layer will be the first layer to be sputtered from the sputtering cathode 17 and will, of course, be the first layer to be deposited on the diamond during the sputtering operation creating a poor bond between the diamond and the metal unless this material is completely removed during the cleanup bombardment which continues to operate during the sputtering sequence. Unnecessary taxation of the cleanup capacity will, of course, result in less efficient operation.

For this reason, throughout the application of the glow discharge during the actual cleaning cycle, sputtering cathode 17 is electrically connected (within the D.C. power supply 39) to cathode 11 so that these two electrodes are at the same potential. In this case the tendency is to clean sputtering cathode 17 rather than for accumulations to appear thereon and cathode 17 remains clean for the succeeding sputtering step.

Up to this time, sputtering cathode 17 will have been kept at a distance from the zone of glow discharge between anode 16 and cathode 11 as shown by the dotted view of sputtering cathode 17 in order to minimize contamination thereof. Also, in order to facilitate the systematic exposure of all diamond surfaces to the cleaning effect of the gaseous ion bombardment, cathode 11 is continuously rocked to and fro during the cleaning cycle causing the diamond material 38 to tumble over to expose its different surfaces to the collision of gas ions therewith on their way toward cathode 11. These high-velocity ions strike the diamond material 38 resting upon cathode 11 dislodging from the surface of the diamond material any non-diamond material present thereon. Thus, although diamond is a relatively poor electrical conductor, bombarding gas ions can be directed thereagainst as a result of the orientation of the electrodes 11 and 16 relative to each other.

The number of ions bombarding the diamond material and their velocity will be determined by the potential assumed by the diamond surface based on the secondary emission ratio. If there is no surface conductance present the number of ions arriving at the diamond material will be equal to the number of electrons arriving. Since the diamond material 38 is placed within conducting metal cathode 11, as the surface conductance of cathode 11 increases, the number of ions striking the diamond also increases.

In contrast to electron bombardment by electron emission, ion bombardment by glow discharge does not require high operating temperatures, because the current density is kept low in the instant process. As a result the diamond material is kept at relatively low temperatures, i.e., the temperature set and controlled by heater 22. Also, the momentum of ions in bombarding the surface is much greater than would be the case with electrons. Thus, with the combined heating and ion bombardment, even any tightly bound oxide coating is easily removed from the surface of the diamond material 38 without causing graphitization.

The device for agitating the diamond material 38 comprises rocker arm 41 rotatably supported by cathode mounting mast 33 and vertical arm 42 connected to mast 33 by means of a bracket mount; crank 43, stop members 44, 46; rotating magnet 47, and drive means therefor (not shown). The advantage of this arrangement is that the seal for a rotating shaft which would otherwise be required can be eliminated thereby simplifying the overall sealing problem of the assembly 10.

During the cleaning cycle (and later during the coating operation) magnet 47 is rotated slowly as shown by the arrow, magnet 47 meanwhile causes a swinging movement of metal crank 43 to and fro to the extent permitted by stops 44, 46. In the position shown, arm 48 of magnet 47 has by magnetic attraction caused crank 43 to rotate in the clockwise direction until stopped by stop 44. This sudden stop serves to jar the diamond material 38 in cathode 11. After a short while when arm 49 has rotated into position to exert its magnetic influence on crank 43, crank 43 is caused to rotate quickly in the counter-clockwise direction until its rotation is interrupted by stop 46 awaiting its clockwise rotation with arm 49. As crank 43 rotates, cathode 11 also rotates and the sudden stops of crank 43 cause the requisite degree of agitation of diamond material 38.

Once the surface of the diamond material 38 has been purged of adsorbed gas and other materials, the diamond material is ready for the application thereto of a metal film.

The metal comprising this film or coating is supplied by sputtering particles of metal by ion bombardment from sputtering electrode 17. The metal which is liberated within bell jar 12 impinges upon all the surfaces within the enclosure, including the surface of the diamond material 38 to which the metal adheres securely due to the very clean condition of the diamond.

To initiate sputtering of metal from electrode 17 to coat diamond material 38, sputtering cathode 17 supported on rotatable rod 51 is swung into the operating position by means of handle 52 to a location in the region between anode 16 and receiver cathode 11. Previously the cathode 17 will most likely have been located out of the way during the cleaning cycle as shown in dotted lines in FIG. 1. Switch 54 will have been closed to connect sputtering cathode 17 to power supply 39 in order to enable retention of electrode 17 at the same potential as cathode 11. Adjustment is now made in power supply 39 to make sputtering cathode 17 more negative than the potential of cathode 11, which remains operative during the sputtering operation; thereby, a glow discharge is established between anode 16 and sputtering cathode 17 as well as between anode 16 and cathode 11.

During the sputtering of coating metal the ion bombardment of diamond material 38 is maintained in order to continue purging the surface thereof. Once a glow discharge has been established between anode 16 and cathode 17 the impingement of ions upon the surface of cathode 17 is initiated. This ion bombardment causes the sputtering or the literal "knocking off" of very small particles of metal from the surface of cathode 17, which particles of metal deposit upon, adhere to and coat the surface of the diamond material 38. The rate of deposition of metal removed by the sputtering of the surface of sputtering electrode 17 relative to the rate of removal of the metal from the diamond surface 38 by the continued ion bombardment of diamond material 38 can be increased by making the cathode 11 even more positive than the potential of sputtering electrode 17 thereby promoting a larger net build-up of metal on the surface of the diamond material 38. During the metallizing operation, cathode 11 is rocked in the aforedescribed manner to cause the particles of diamond material to reorient themselves so that all of the surfaces thereof will be exposed to the metal deposition.

By adjusting the output of power supply 39 to leads 56 and 57, cathode 11 may be made continually even more positive as the metallizing operation proceeds whereby simultaneously the rate of removal of sputtered metal from the surface of the diamond material 38 decreases and the rate of sputtering of metal from electrode 17 increases thereby increasing the rate of net deposition of metal upon the surface of diamond material 38 to produce a thicker metal film or coating. It may readily be appreciated that the rate of adjustment of the output of power supply 39 may be automated or programmed, if desired.

After the sputtering operation has begun, heater 22 is disconnected and the receiver cathode 11 is allowed to cool off and throughout the sputtering operation argon-enriched hydrogen is admitted to and flushed from bell jar 12 to help reduce any oxide formation and to aid in keeping the system clean.

Various metals may be used for coating diamond, for example, molybdenum, titanium. In the case of molybdenum films applied as described herein, it was found that such films are much harder than ordinary rods or sheets of molybdenum, but the reason for this is not now known.

The use of this process is not limited to the deposition of a single layer of metal on diamond material 38 and the apparatus in FIG. 1 may be employed for a two-coat operation. Thus, a second sputtering electrode (not shown) may be supported upon rotatable rod 51 and moved into or out of operative sputtering position by moving the handle 56. Thus, material of which the second sputtering electrode is composed would preferably be a metal which can be brazed to the coating metal whereby after the second coating has been applied, the doubly-coated diamond crystals may be coordinated into a conglomerate mass or compact. As an example, an initial coating of molybdenum may be coated with copper and then a plurality of doubly-coated crystals may be compressed in an inert atmosphere under a light pressure, about 5 kilobars more or less (1 kilobar equals 987 atmospheres), while the copper is sintered or melted resulting in a compact of the diamonds.

Thus, by the use of the novel process described herein in the apparatus illustrated and described, a bond of reliable structural integrity can now be produced between a diamond surface and a metal layer applied thereto. This process is particularly useful in enabling the successful completion of the preliminary step in the assembly of multiple small man-produced diamonds into sizeable compacts sufficiently large to replace natural diamonds in single point tools, drills, well bits, etc.

Although the above description has been directed to the deposition of a coating completely around a diamond crystal, the process is broadly applicable to the process of coating in part or in whole hard, relatively inert crystalline substances wherein the creation of a strong reliable intermetallic layer between substrate and metallic layer has been found to be very difficult or impossible, wherein the chemical nature of the materials to be joined is not readily conducive to the creation of a chemical-type bond and wherein any substantial elevation in the temperature of the substrate must be avoided to prevent the destruction or damage thereof. Such a set of conditions may apply, for example, in the connection of terminals to certain semiconductors. In a case of this nature it is desirable to be able to strongly bond a patch of metal to a small portion of the surface of a semiconductor with the aforementioned method whereby a terminal can later be joined to the semiconductor by brazing or soldering. In this manner high temperatures, which can be expected to change the semiconducting properties of the substrate, can be avoided.

The success of this coating process whereby it is productive of such strong bonds is due in part to the mechanical shear-resistant bond strength induced by the close contact of the metal coat with the surface physically modified by the ion bombardment and in part to the strong physical attraction promoted between the consistently cleaned diamond surface and the deposited metal coating. Another important aspect is the factor of the freedom of this process from the generation of excess heat such as would graphitize the diamond surface, which production of graphite has been proven to be responsible in the past for the poor metal-to-diamond bond produced in metal coating operations for diamonds.

Obviously, many modifications and variations of the present invention are possible in the light of the above teachings. It is therefore to be understood, that within the scope of the appended claims, the invention may be practiced otherwise than as specifically described.

What we claim as new and desire to secure by Letters Patent of the United States is:

1. The method of cleaning and coating crystalline material by the use of glow discharge ion bombardment within an evacuated chamber having an anode and a plurality of cathodes located therein which comprises:
 (a) placing one or more diamond crystals upon a first cathode within a closed chamber,
   (1) the diamond material being disposed between surface area of said first cathode and an anode spaced therefrom within said chamber,
 (b) evacuating said chamber,
 (c) heating the interior of said chamber,
 (d) continuing evacuation of said chamber and simultaneously introducing hydrogen at a rate establishing the internal pressure of said chamber at between about 100 and about 200 microns Hg,
 (e) adding a flow of an inert gas to the flow of hydrogen,
 (f) controllably locally heating said first cathode and diamond material,
 (g) maintaining the temperature thereof in the range of from about 600 to about 800° C. during the cleaning operation,
 (h) impressing a voltage differential between said anode and said first cathode to create glow discharge conditions within said chamber whereby gas ions leave the vicinity of said anode and travel toward said first cathode impinging upon said diamond material,
 (i) electrically connecting a second electrode located within said chamber into the system at substantially the same potential as said first cathode,
 (j) continuing the glow discharge-induced ion bombardment for a period of time to effectively clean the surfaces of the diamond material,
 (k) discontinuing the heating of said first cathode and diamond material to allow the cooling thereof to the temperature in said chamber,
 (l) changing the relative potential of said first and second cathodes to make said second cathode more negative than said first cathode, and
 (m) thereafter continuing the glow discharge-induced ion bombardment of both said first and second cathodes for a period of time sufficient for coating the exposed diamond surfaces, during which period of time particles of metal are sputtered from said second cathode, settle upon and strongly adhere to the diamond material.

2. The method of cleaning and coating crystalline material by glow discharge substantially as recited in claim 1 wherein argon is the inert gas added to the hydrogen gas.

3. In a process for cleaning diamond by glow discharge ion bombardment during which process the diamond is located on a receiving cathode in a chamber at a pressure in the range of from about 100 to about 200 microns Hg and said diamond is exposed to the impact of high velocity inert gas ions thereon during glow discharge established between an anode located spaced from said receiving cathode and said receiving cathode, the improvement comprising:
 (a) heating said receiving cathode during ion bombardment to raise the temperature thereof to a temperature of at least about 600° C. enabling free movement of the gas ions out of the diamond lattice, whereby the buildup of gas ions in said lattice is prevented.

References Cited

UNITED STATES PATENTS

| 2,382,666 | 8/1945 | Rohrig et al. | 75—226 |
| 2,505,370 | 4/1950 | Sykes | 204—192 |
| 3,021,271 | 2/1962 | Wehner | 204—192 |
| 3,271,285 | 9/1966 | Skoda | 204—298 |

FOREIGN PATENTS

| 1,294,562 | 4/1962 | France. |
| 779,347 | 7/1957 | Great Britain. |

OTHER REFERENCES

Wehner: Advances in Electronics and Electron Physics, vol. VII, 1955, Academic Press Inc. pub. New York, page 253.

JOHN H. MACK, *Primary Examiner.*

R. K. MIHALEK, *Assistant Examiner.*